Feb. 22, 1927.                          1,618,823
J. E. HALE
TIRE CONSTRUCTION
Filed March 12, 1925

INVENTOR.
JAMES E. HALE.
BY
ATTORNEY.

Patented Feb. 22, 1927.

1,618,823

UNITED STATES PATENT OFFICE.

JAMES E. HALE, OF AKRON, OHIO, ASSIGNOR TO THE FIRESTONE TIRE AND RUBBER COMPANY, OF AKRON, OHIO, A CORPORATION OF OHIO.

TIRE CONSTRUCTION.

Application filed March 12, 1925. Serial No. 14,903.

This invention relates to motorcycle and bicycle tires or tires for like vehicles.

The object of the invention is to provide a tire of the above class in which provision is made for the prevention of skidding on turns where the vehicle is inclined at an angle to the ground and the tire rolls on the ground on the edge of its tread portion.

In particular the invention contemplates the formation of one or more circumferential ribs on the edges of the tread which are preferably of hook-shape in section to resist sidewise skidding and which are also formed with spaced transverse notches to afford good tractive qualities.

The foregoing and other objects are obtained by the tire illustrated in the accompanying drawings and described in detail below. It is to be understood that the invention is not limited to the specific tire construction shown and described.

Of the accompanying drawings—

Figure 1:
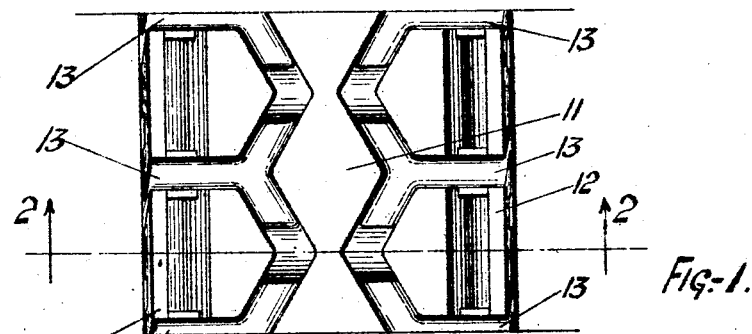
Figure 1 is a plan of a section of a tire embodying the invention.
Figure 2:
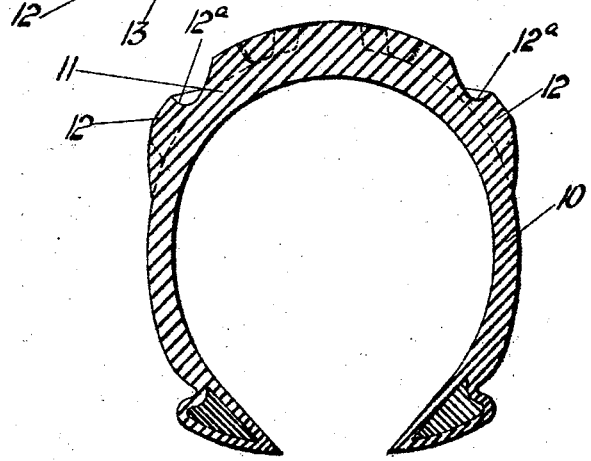
Figure 2 is a section on line 2—2 of Figure 1.

Referring to the drawings, 10 is the carcass and 11 the tread of the tire which may be of either the clincher type as shown, or of the straight side type. The main portion of the tread may be of any suitable non-skid design, but at each edge, circumferential ribs 12, 12 are provided, the ribs 12 preferably being formed with hook-like portions 12ª on their inner edges to prevent sidewise skidding. The ribs 12 are notched circumferentially of the tire as indicated at 13, 13 to afford traction of the tire when rolling on said ribs 12.

Figure 3:
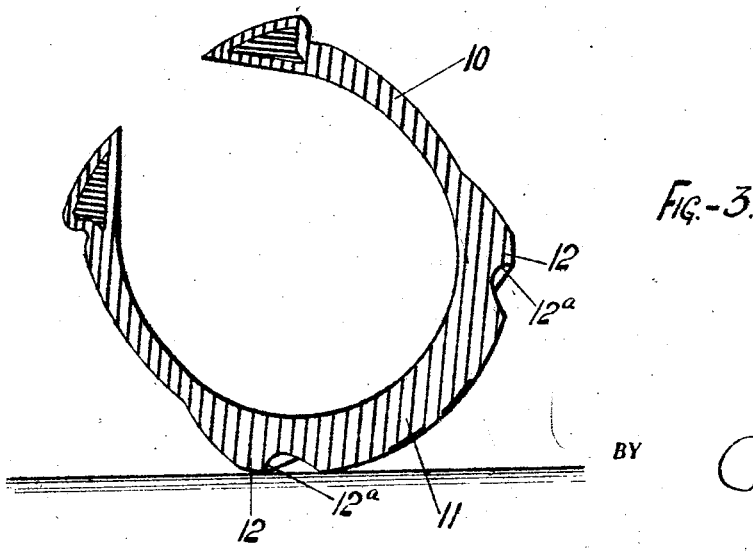
Figure 3 is a section through a tire positioned at an angle to the ground and illustrating how the notched ribs are brought into play in making turns to prevent sidewise skidding.

It will be apparent from Figure 3 that when making turns, the tires being at an acute angle as shown, the ribs 12 will come into play and will cause the tire to grip onto the road in such a manner that the vehicle will not slide. The notches 13 will also provide for traction of the tire on the road at acute angles without spinning of the wheels resulting.

Modifications of the invention may be resorted to without departing from the spirit thereof or the scope of the appended claim.

What is claimed is:

A tire for motorcycles, bicycles or the like, having circumferential ribs about the edges of the tread portion, said ribs being substantially hook-shaped in cross-section and being formed with notches spaced circumferentially therein.

JAMES E. HALE.